US011156500B2

United States Patent
Kasahara et al.

(10) Patent No.: US 11,156,500 B2
(45) Date of Patent: Oct. 26, 2021

(54) OPTICAL MEASUREMENT CONTROL PROGRAM, OPTICAL MEASUREMENT SYSTEM, AND OPTICAL MEASUREMENT METHOD

(71) Applicant: HAMAMATSU PHOTONICS K.K., Hamamatsu (JP)

(72) Inventors: Takashi Kasahara, Hamamatsu (JP); Katsumi Shibayama, Hamamatsu (JP); Masaki Hirose, Hamamatsu (JP); Toshimitsu Kawai, Hamamatsu (JP); Hiroki Oyama, Hamamatsu (JP); Yumi Kuramoto, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 16/609,270

(22) PCT Filed: Apr. 24, 2018

(86) PCT No.: PCT/JP2018/016636
§ 371 (c)(1),
(2) Date: Oct. 29, 2019

(87) PCT Pub. No.: WO2018/203495
PCT Pub. Date: Nov. 8, 2018

(65) Prior Publication Data
US 2020/0191652 A1 Jun. 18, 2020

(30) Foreign Application Priority Data
May 1, 2017 (JP) .............................. JP2017-091335

(51) Int. Cl.
*G01J 3/26* (2006.01)
*G02B 5/28* (2006.01)
(Continued)

(52) U.S. Cl.
CPC ................ *G01J 3/26* (2013.01); *G02B 5/284* (2013.01); *G02B 26/002* (2013.01); *G01J 2003/1226* (2013.01)

(58) Field of Classification Search
CPC .... G01J 3/26; G01J 2003/1226; G02B 5/284; G02B 5/28; G02B 26/002; G02B 26/00
See application file for complete search history.

(56) References Cited

U.S. PATENT DOCUMENTS 8,711,368 B2 * 4/2014 Matsuno ................... G01J 3/26
356/519
2011/0176128 A1 7/2011 Matsuno
(Continued)

FOREIGN PATENT DOCUMENTS

CN 102135662 A 7/2011
CN 105339829 A 2/2016
(Continued)

OTHER PUBLICATIONS

International Preliminary Report on Patentability dated Nov. 14, 2019 for PCT/JP2018/016636.

*Primary Examiner* — Jonathan M Hansen
(74) *Attorney, Agent, or Firm* — Faegre Drinker Biddle & Reath LLP

(57) ABSTRACT

Provided is a non-transitory computer-readable recording medium recording an optical measurement control program in a light detection device, the program causing a computer to execute a process of measuring light to be measured by acquiring an electric signal output from the light detector, the optical measurement control program causing the computer to function as: a voltage control unit controlling the potential difference generated between the pair of mirrors to gradually increase until the potential difference reaches a set potential difference corresponding to a wavelength of the light to be measured before the acquisition of the electric (Continued)

signal is started; and a signal acquisition unit acquiring the electric signal in a state where the voltage control unit allows the set potential difference to be generated between the pair of mirrors.

24 Claims, 9 Drawing Sheets

(51) Int. Cl.
*G02B 26/00* (2006.01)
*G01J 3/12* (2006.01)

(56) References Cited

U.S. PATENT DOCUMENTS

| | | |
|---|---|---|
| 2012/0013905 A1 | 1/2012 | Nozawa |
| 2012/0133947 A1 | 5/2012 | Nozawa |
| 2014/0240508 A1* | 8/2014 | Gomi .................. G01J 3/0235 348/162 |
| 2016/0183770 A1 | 6/2016 | Ito |
| 2016/0370230 A1 | 12/2016 | Nishimura |

FOREIGN PATENT DOCUMENTS

| | | |
|---|---|---|
| CN | 106257247 A | 12/2016 |
| JP | 2011-191492 A | 9/2011 |
| JP | 2012-113133 A | 6/2012 |
| JP | 2016-166865 A | 9/2016 |
| JP | 2017-009358 A | 1/2017 |
| TW | 201333546 A | 8/2013 |
| WO | WO-2017/057372 A1 | 4/2017 |

\* cited by examiner

*Fig.5*

| ITEM | | SET VOLTAGE | | TIME |
|---|---|---|---|---|
| START | | 0V | | |
| VOLTAGE SETTING FOR THE MEASUREMENT START | | 1V | | 5msec |
| | | 2V | | 5msec |
| | | ... | | ... |
| | | FIRST WAVELENGTH VOLTAGE | | 5msec |
| STANDBY TIME AFTER RISE OF VOLTAGE | | FIRST WAVELENGTH VOLTAGE | | 200msec |
| TEMPERATURE MEASUREMENT | VOLTAGE SETTING | FIRST WAVELENGTH VOLTAGE | | |
| | ACQUISITION STANDBY TIME | FIRST WAVELENGTH VOLTAGE | | 1msec |
| | PROCESSING TIME | FIRST WAVELENGTH VOLTAGE | | 4msec |
| FIRST WAVELENGTH MEASUREMENT | VOLTAGE SETTING | FIRST WAVELENGTH VOLTAGE | | |
| | ACQUISITION STANDBY TIME | FIRST WAVELENGTH VOLTAGE | | 1msec |
| | PROCESSING TIME | FIRST WAVELENGTH VOLTAGE | | 4msec |
| SECOND WAVELENGTH MEASUREMENT | VOLTAGE SETTING | SECOND WAVELENGTH VOLTAGE | | |
| | ACQUISITION STANDBY TIME | SECOND WAVELENGTH VOLTAGE | | 1msec |
| | PROCESSING TIME | SECOND WAVELENGTH VOLTAGE | | 4msec |
| ... | | ... | | ... |
| VOLTAGE SETTING AFTER COMPLETION OF MEASUREMENT | | VOLTAGE AT TIME OF COMPLETION OF MEASUREMENT -1V | | 5msec |
| | | VOLTAGE AT TIME OF COMPLETION OF MEASUREMENT -2V | | 5msec |
| | | ... | | ... |
| | | 0V | | 5msec |

Fig. 8

| SAMPLE | ITEM | | SET VOLTAGE | TIME |
|---|---|---|---|---|
| FIRST SAMPLE | START | | | |
| | VOLTAGE SETTING FOR THE MEASUREMENT START | | 1V | 5msec |
| | | | 2V | 5msec |
| | | | ... | ... |
| | | | FIRST WAVELENGTH VOLTAGE | 5msec |
| | STANDBY TIME AFTER RISE OF VOLTAGE | | FIRST WAVELENGTH VOLTAGE | 200msec |
| | TEMPERATURE MEASUREMENT | VOLTAGE SETTING | FIRST WAVELENGTH VOLTAGE | |
| | | ACQUISITION STANDBY TIME | FIRST WAVELENGTH VOLTAGE | 1msec |
| | | PROCESSING TIME | FIRST WAVELENGTH VOLTAGE | 4msec |
| | FIRST WAVELENGTH MEASUREMENT | VOLTAGE SETTING | FIRST WAVELENGTH VOLTAGE | |
| | | ACQUISITION STANDBY TIME | FIRST WAVELENGTH VOLTAGE | 1msec |
| | | PROCESSING TIME | FIRST WAVELENGTH VOLTAGE | 4msec |
| | SECOND WAVELENGTH MEASUREMENT | VOLTAGE SETTING | SECOND WAVELENGTH VOLTAGE | |
| | | ACQUISITION STANDBY TIME | SECOND WAVELENGTH VOLTAGE | 1msec |
| | | PROCESSING TIME | SECOND WAVELENGTH VOLTAGE | 4msec |
| | ... | | ... | ... |
| | VOLTAGE SETTING AFTER COMPLETION OF MEASUREMENT | | VOLTAGE AT TIME OF COMPLETION OF MEASUREMENT-1V | 5msec |
| | | | VOLTAGE AT TIME OF COMPLETION OF MEASUREMENT-2V | 5msec |
| | | | ... | ... |
| | | | 0V | 5msec |
| INTER-SAMPLE | INTER-SAMPLE STANDBY TIME | | 0V | 300msec |
| SECOND SAMPLE | VOLTAGE SETTING FOR THE MEASUREMENT START | | 1V | 5msec |
| | | | 2V | 5msec |
| | | | ... | ... |
| | | | FIRST WAVELENGTH VOLTAGE | 5msec |
| | STANDBY TIME AFTER RISE OF VOLTAGE | | FIRST WAVELENGTH VOLTAGE | 200msec |
| | TEMPERATURE MEASUREMENT | VOLTAGE SETTING | FIRST WAVELENGTH VOLTAGE | |
| | | ACQUISITION STANDBY TIME | FIRST WAVELENGTH VOLTAGE | 1msec |
| | | PROCESSING TIME | FIRST WAVELENGTH VOLTAGE | 4msec |
| | FIRST WAVELENGTH MEASUREMENT | VOLTAGE SETTING | FIRST WAVELENGTH VOLTAGE | |
| | | ACQUISITION STANDBY TIME | FIRST WAVELENGTH VOLTAGE | 1msec |
| | | PROCESSING TIME | FIRST WAVELENGTH VOLTAGE | 4msec |
| | SECOND WAVELENGTH MEASUREMENT | VOLTAGE SETTING | SECOND WAVELENGTH VOLTAGE | |
| | | ACQUISITION STANDBY TIME | SECOND WAVELENGTH VOLTAGE | 1msec |
| | | PROCESSING TIME | SECOND WAVELENGTH VOLTAGE | 4msec |
| | ... | | ... | ... |
| | VOLTAGE SETTING AFTER COMPLETION OF MEASUREMENT | | VOLTAGE AT TIME OF COMPLETION OF MEASUREMENT-1V | 5msec |
| | | | VOLTAGE AT TIME OF COMPLETION OF MEASUREMENT-2V | 5msec |
| | | | ... | ... |
| | | | 0V | 5msec |
| INTER-SAMPLE | INTER-SAMPLE STANDBY TIME | | 0V | 300msec |
| REPEAT TIMES OF ARBITRARY NUMBER OF SAMPLES | | | | |
| COMPLETION OF MEASUREMENT | COMPLETION OF MEASUREMENT | | | |

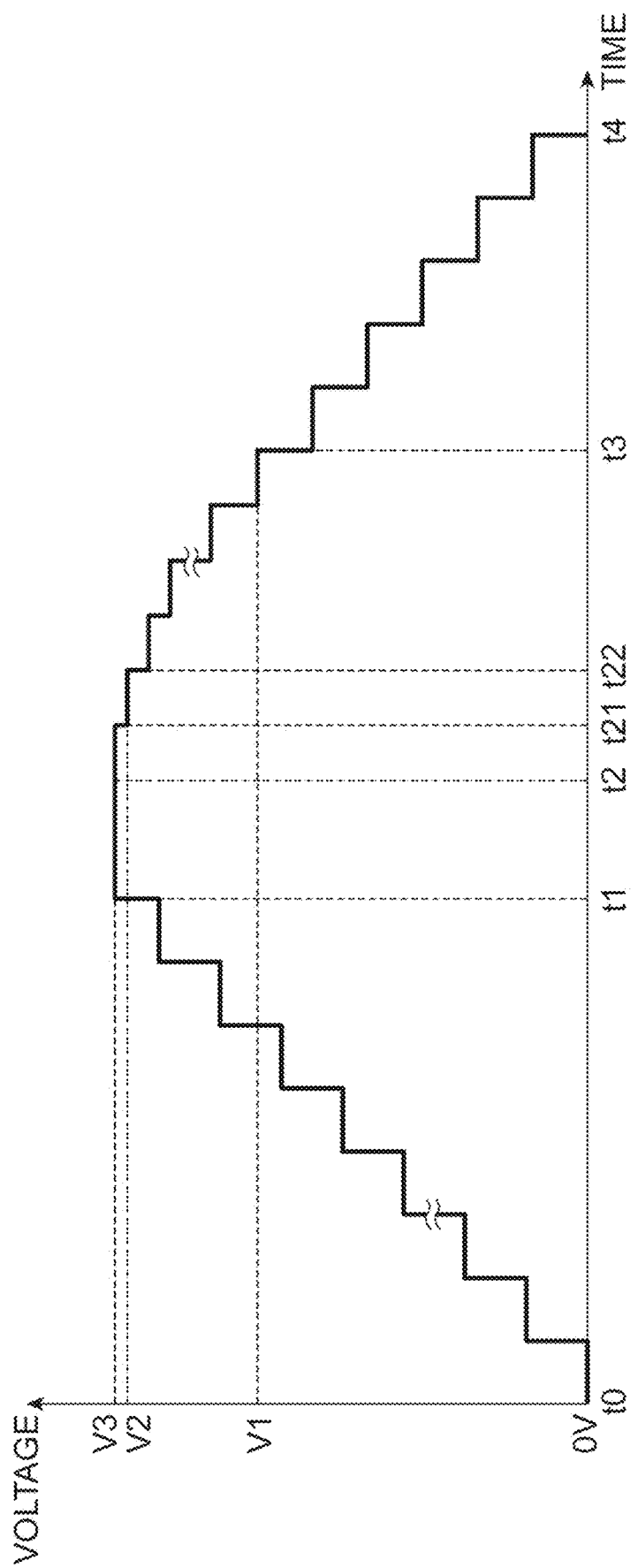

OPTICAL MEASUREMENT CONTROL PROGRAM, OPTICAL MEASUREMENT SYSTEM, AND OPTICAL MEASUREMENT METHOD

TECHNICAL FIELD

The present disclosure relates to an optical measurement control program, an optical measurement system, and an optical measurement method.

BACKGROUND ART

In the related art, a light detection device provided with a Fabry-Perot interference type optical filter has been known. For example, a spectral measurement device disclosed in Patent Literature 1 includes an optical filter and a light reception element that receives light transmitted through the optical filter. The optical filter has a first substrate and a second substrate facing each other, and the distance between the first substrate and the second substrate is controlled by an electrostatic actuator. By controlling the distance, the transmission wavelength of the optical filter is controlled.

CITATION LIST

Patent Literature

Patent Literature 1: Japanese Unexamined Patent Publication No. 2011-191492

SUMMARY OF INVENTION

Technical Problem

However, in the technique disclosed in Patent Literature 1, a voltage is rapidly applied from the initial state where no voltage is applied to the time when a target voltage is reached. In this case, so-called overshoot may occur in which the applied voltage exceeds the target voltage. For this reason, the gap becomes smaller than the target, and thus, there is a concern that sticking may occur due to the pull-in phenomenon. In this case, there is a concern that stable measurement may be difficult.

One aspect of the present disclosure is to provide an optical measurement control program, an optical measurement system, and an optical measurement method that enable stable optical measurement by using a Fabry-Perot interference filter.

Solution to Problem

According to an aspect of the invention, there is provided an optical measurement control program in a light detection device including: a Fabry-Perot interference filter having a pair of mirror portions facing each other via a gap, a distance between the pair of mirror portions changing according to the potential difference generated between the pair of mirror portions; and a light detector detecting light transmitted through the Fabry-Perot interference filter, the optical measurement control program causing a computer to execute a process of measuring light to be measured by acquiring an electric signal output from the light detector, the optical measurement control program causing the computer to function as: a voltage control unit controlling the potential difference generated between the pair of mirror portions to gradually increase until the potential difference reaches a set potential difference corresponding to a wavelength of the light to be measured before the acquisition of the electric signal is started; and a signal acquisition unit acquiring the electric signal in a state where the voltage control unit allows the set potential difference to be generated between the pair of mirror portions.

According to an aspect of the invention, there is provided an optical measurement system including: a Fabry-Perot interference filter having a pair of mirror portions facing each other via a gap, a distance between the pair of mirror portions changing according to a potential difference generated between the pair of mirror portions; a light detection unit detecting light transmitted through the Fabry-Perot interference filter; and a control unit controlling the potential difference generated between the pair of mirror portions and acquiring an electric signal output from the light detection unit, in which the control unit includes: a voltage control unit allowing a set potential difference to be generated between the pair of mirror portions according to a wavelength of light to be measured such that a wavelength of light transmitted through the Fabry-Perot interference filter becomes the wavelength of the light to be measured; and a signal acquisition unit acquiring the electric signal in a state where the voltage control unit allows the set potential difference to be generated between the pair of mirror portions, and in which the voltage control unit allows the potential difference generated between the pair of mirror portions to gradually increase until the potential difference reaches the set potential difference before the acquisition of the electric signal is started by the signal acquisition unit.

In addition, according to an aspect of the invention, there is provided an optical measurement method of measuring light to be measured by acquiring an electric signal output from a light detector by using a light detection device including: a Fabry-Perot interference filter having a pair of mirror portions facing each other via a gap, a distance between the pair of mirror portions changing according to a potential difference generated between the pair of mirror portions; and the light detector detecting light transmitted through the Fabry-Perot interference filter, the optical measurement method including: a voltage control step of gradually increasing the potential difference generated between the pair of mirror portions until the potential difference reaches a set potential difference corresponding to a wavelength of the light to be measured before the acquisition of the electric signal is started; and a signal acquisition step of acquiring the electric signal in a state where the set potential difference is generated between the pair of mirror portions after the voltage control step.

In the optical measurement control program, the optical measurement system, and the optical measurement method, the distance between the pair of mirror portions is controlled according to the magnitude of the potential difference generated between the pair of mirror portions. Accordingly, it is possible to control the wavelength of the light transmitted through the Fabry-Perot interference filter. In this case, it is possible to detect the light of the wavelength to be measured by generating the set potential difference corresponding to the wavelength of the light to be measured. Herein, the potential difference generated between the pair of mirror portions is allowed to gradually increase until the potential difference reaches the set potential difference. For this reason, the occurrence of overshoot is suppressed in comparison to a case where the potential difference is allowed to rapidly increase. Accordingly, sticking between the pair of mirror portions is suppressed. Therefore, the stable optical measurement using the Fabry-Perot interference filter is enabled.

In addition, in one aspect, a signal may be acquired after a standby time period has elapsed since the potential difference generated between the pair of mirror portions reaches the set potential difference. According to this configuration, even if the temperature of the Fabry-Perot interference filter is increased due to the increase of the set potential difference generated between the pair of mirror portions, the temperature of the Fabry-Perot interference filter is stabilized by the standby time period, so that it is possible to suppress the variation of the transmission wavelength of the Fabry-Perot interference filter.

In addition, in one aspect, the temperature of the Fabry-Perot interference filter may be acquired after the potential difference generated between the pair of mirror portions reaches the set potential difference and before the electric signal is acquired. According to this configuration, a temperature close to the temperature of the Fabry-Perot interference filter when the electric signal is acquired can be acquired. Accordingly, for example, it is possible to perform correction of the set potential difference on the basis of the measured temperature.

In addition, in one aspect, after the electric signal is acquired, the potential difference generated between the pair of mirror portions may be gradually decreased from the set potential difference. According to this configuration, since the distance between the pair of mirror portions is gradually changed after the completion of measurement, it is possible to suppress the vibration of the mirror portions. In this case, for example, it is possible to quickly start the next measurement.

In addition, in one aspect, the set potential difference may include a plurality of set potential differences corresponding to a plurality of different wavelengths, each of the plurality of set potential differences may be allowed to be sequentially generated between the pair of mirror portions, and the potential difference generated between the pair of mirror portions may be allowed to gradually increase until the potential difference reaches an initial set potential difference among the plurality of set potential differences before the acquisition of the electric signal is started. In this case, it is possible to obtain a spectroscopic spectrum by the optical measurement control program, the optical measurement system, and the optical measurement method.

In addition, in one aspect, each of the plurality of set potential differences may be allowed to be generated between the pair of mirror portions in ascending order of the plurality of set potential differences. In this case, since the set potential difference initially generated between the pair of mirror portions is minimized, it is possible to reduce the risk of occurrence of sticking.

In addition, in one aspect, each of the plurality of set potential differences may be generated between the pair of mirror portions in the descending order of the plurality of set potential differences. In this case, since the optical measurement proceeds while the electrical load on the Fabry-Perot interference filter is reduced, it is possible to suppress a change in temperature of the Fabry-Perot interference filter. Accordingly, a variation in wavelength of the light transmitted through the Fabry-Perot interference filter is suppressed.

Effects of Invention

According to the optical measurement control program, the optical measurement system, and the optical measurement method of one aspect, stable optical measurement using the Fabry-Perot interference filter is enabled.

BRIEF DESCRIPTION OF DRAWINGS

FIG. 5 is a table representing a flow of measurement by the light detection device.

FIG. 8 is a table representing another example of the flow of measurement by the light detection device.

FIG. 9 is a graph showing another example of the relationship between the voltage applied to the Fabry-Perot interference filter and the time.

DESCRIPTION OF EMBODIMENTS

Figure 1:
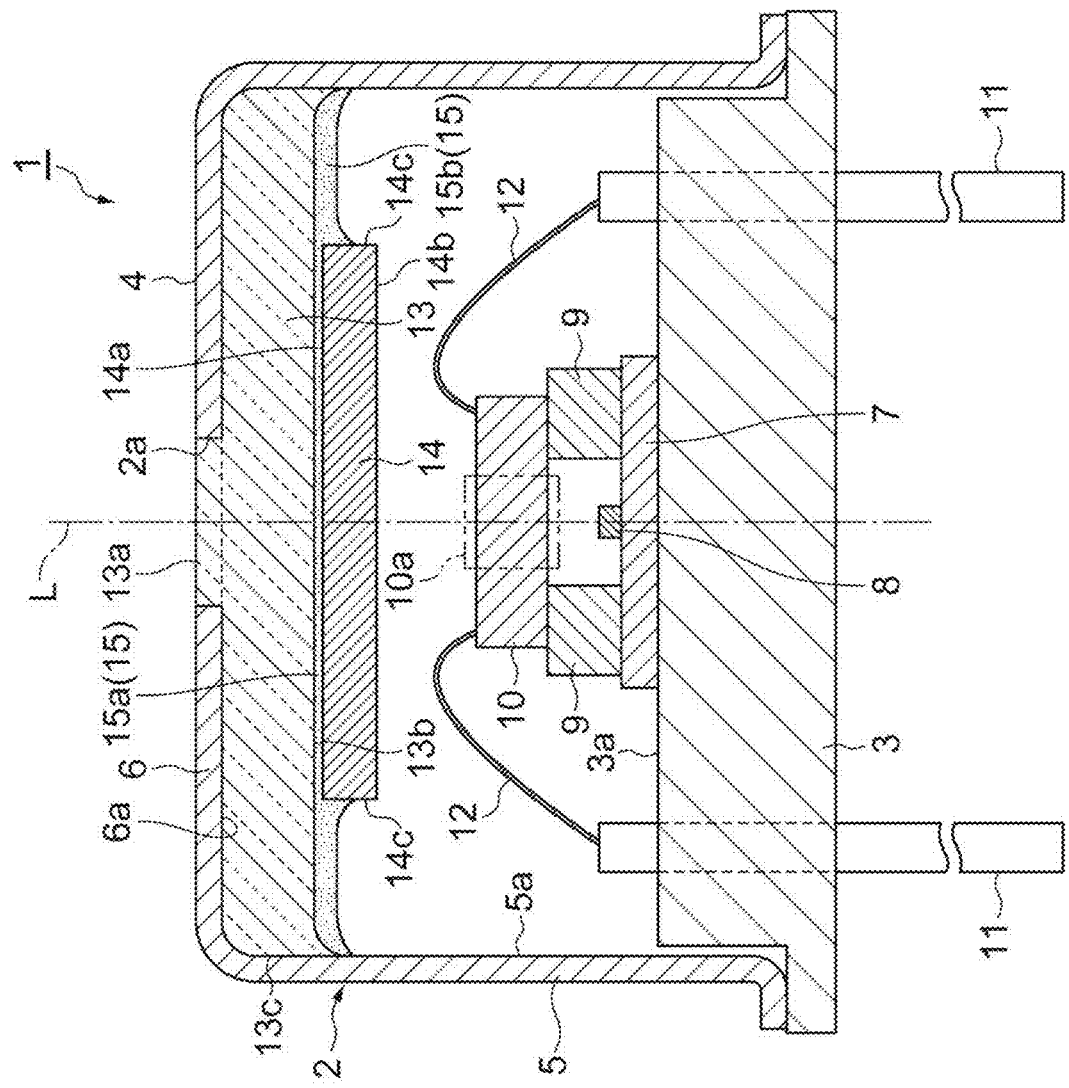
FIG. 1 is a cross-sectional view of a light detection device according to an embodiment.

Hereinafter, embodiments according to the present disclosure will be specifically described with reference to the drawings. For the convenience, in some cases, substantially the same elements may be denoted by the same reference numerals, and the description may be omitted. In addition, an optical measurement system according to the present embodiment can be used for, for example, identification of substances in fluid, sorting of plastics flowing in a line, and the like. In such applications, in some cases, a plurality of samples may be measured continuously at a high speed.

First, prior to the description of the optical measurement system, an example of a light detection device used in the optical measurement system will be described with reference to FIGS. 1 to 3. As illustrated in FIG. 1, a light detection device 1 includes a package 2. The package 2 is a CAN package having a stem 3 and a cap 4. The cap 4 is integrally configured by a side wall 5 and a top wall 6. The stem 3 and the cap 4 are made of a metal material and are airtightly bonded to each other. In the package 2 made of a metal material, the shape of the side wall 5 is cylindrical with a predetermined line L as a center line. The stem 3 and the top wall 6 face each other in the direction parallel to the line L, and close the both ends of the side wall 5, respectively.

A wiring substrate 7 is fixed to an inner surface 3a of the stein 3. As a substrate material of the wiring substrate 7, for example, silicon, ceramic, quartz, glass, plastic, or the like can be used. A light detector (light detection unit) 8 and a temperature detector 16 (refer to FIG. 4) such as a thermistor are mounted on the wiring substrate 7. The light detector 8 is disposed on the line L. More specifically, the light detector 8 is disposed such that the center line of the light reception portion coincides with the line L. The light detector 8 is, for example, an infrared detector such as a quantum sensor using InGaAs or the like, a thermal sensor using a thermopile or a bolometer, or the like. In the case of detecting light in each wavelength range of ultraviolet, visible, and near infrared, for example, a silicon photodiode or the like can be used as the light detector 8. In addition, the light detector 8 may be provided with one light reception portion or may be provided with a plurality of light reception portions in an array shape. Furthermore, a plurality of light detectors 8 may be mounted on the wiring substrate 7. The temperature detector 16 may be disposed, for example, at a position close to a Fabry-Perot interference filter 10 such that the change in temperature of the Fabry-Perot interference filter 10 can be detected.

A plurality of spacers 9 are fixed on the wiring substrate 7. As a material of each spacer 9, for example, silicon, ceramic, quartz, glass, plastic, or the like can be used. The Fabry-Perot interference filter 10 is fixed on the plurality of spacers 9 by, for example, an adhesive. The Fabry-Perot interference filter 10 is disposed on the line L. More specifically, the Fabry-Perot interference filter 10 is disposed such that the center line of a light transmission region 10a coincides with the line L. In addition, the spacer 9 may be configured integrally with the wiring substrate 7. In addition, the Fabry-Perot interference filter 10 may be supported not by the plurality of spacers 9 but by one spacer 9. In addition, the spacer 9 may be configured integrally with the Fabry-Perot interference filter 10.

A plurality of lead pins 11 are fixed to the stem 3. More specifically, each lead pin 11 passes through the stem 3 in a state where electrical insulation and airtightness with the stem 3 are maintained. Each lead pin 11 is electrically connected by a wire 12 to an electrode pad provided on the wiring substrate 7, a terminal of the light detector 8, a terminal of the temperature detector 16, and a terminal of the Fabry-Perot interference filter 10. The light detector 8, the temperature detector 16, and the Fabry-Perot interference filter 10 may be electrically connected to the lead pins 11 through the wiring substrate 7. For example, each terminal may be electrically connected to an electrode pad provided on the wiring substrate 7, and the electrode pad may be connected to each lead pin 11 by the wire 12. This enables input and output of electric signals to and from each of the light detector 8, the temperature detector 16, and the Fabry-Perot interference filter 10.

An opening 2a is formed in the package 2. More specifically, the opening 2a is formed in the top wall 6 of the cap 4 such that the center line of the opening coincides with the line L. When viewed from the direction parallel to the line L, the shape of the opening 2a is circular. A light transmitting member 13 is disposed on an inner surface 6a of the top wall 6 so as to close the opening 2a. The light transmitting member 13 is airtightly bonded to the inner surface 6a of the top wall 6. The light transmitting member 13 has a light incident surface 13a and a light emitting surface (inner surface) 13b facing each other in the direction parallel to the line L and a side surface 13c. The light incident surface 13a of the light transmitting member 13 is substantially flush with the outer surface of the top wall 6 at the opening 2a. The side surface 13c of the light transmitting member 13 is in contact with an inner surface 5a of the side wall 5 of the package 2. That is, the light transmitting member 13 reaches the inside of the opening 2a and the inner surface 5a of the side wall 5. Such a light transmitting member 13 is formed by disposing a glass pellet inside the cap 4 with the opening 2a facing downward and melting the glass pellet. That is, the light transmitting member 13 is made of a fusion glass.

A band pass filter 14 is fixed to the light emitting surface 13b of the light transmitting member 13 by an adhesive member 15. That is, the adhesive member 15 fixes the band pass filter 14 to the inner surface 6a of the top wall 6 through the light transmitting member 13 bonded to the inner surface 6a of the top wall 6. Among the light transmitted through the light transmitting member 13, the band pass filter 14 selectively transmits light (light in a predetermined wavelength range and is incident on the light transmission region 10a of the Fabry-Perot interference filter 10) of a measurement wavelength range of the light detection device 1 (that is, transmits only light in the wavelength range). The band pass filter 14 has a rectangular plate shape. More specifically, the band pass filter 14 has a light incident surface 14a and a light emitting surface 14b facing each other in the direction parallel to the line L and four side surfaces 14c. The band pass filter 14 is configured by forming a dielectric multilayer film (a multilayer film formed by combining, for example, a high refractive material such as $TiO_2$ or $Ta_2O_5$ and a low refractive material such as $SiO_2$ or $MgF_2$) on the surface of a light transmitting member formed in a rectangular plate shape by a light transmitting material (for example, silicon, glass, or the like).

The adhesive member 15 has a first portion 15a disposed in the entire area of the light incident surface 14a of the band pass filter 14. That is, the first portion 15a is a portion of the adhesive member 15 disposed between the light emitting surface 13b of the light transmitting member 13 and the light incident surface 14a of the band pass filter 14 facing each other. Furthermore, the adhesive member 15 has a second portion 15b that protrudes outward from the outer edge of the band pass filter 14 when viewed in the direction parallel to the line L. The second portion 15b extends to the inner surface 5a of the side wall 5 and is in contact with the inner surface 5a of the side wall 5. The second portion 15b is in contact with the side surface 14c of the band pass filter 14.

In the light detection device 1 configured as described above, when light is incident on the band pass filter 14 from the outside through the opening 2a, the light transmitting member 13, and the adhesive member 15, light in a predetermined wavelength range is selectively transmitted. When the light transmitted through the band pass filter 14 is incident on the light transmission region 10a of the Fabry-Perot interference filter 10, the light of the predetermined wavelength among the light in the predetermined wavelength range is selectively transmitted. The light transmitted through the light transmission region 10a of the Fabry-Perot interference filter 10 is incident on the light reception portion of the light detector 8 and is detected by the light detector 8. That is, the light detector 8 converts the light transmitted through the Fabry-Perot interference filter 10 into an electric signal and outputs the electric signal. For example, the light detector 8 outputs an electric signal having a magnitude corresponding to the intensity of light incident on the light reception portion.

Figure 2:
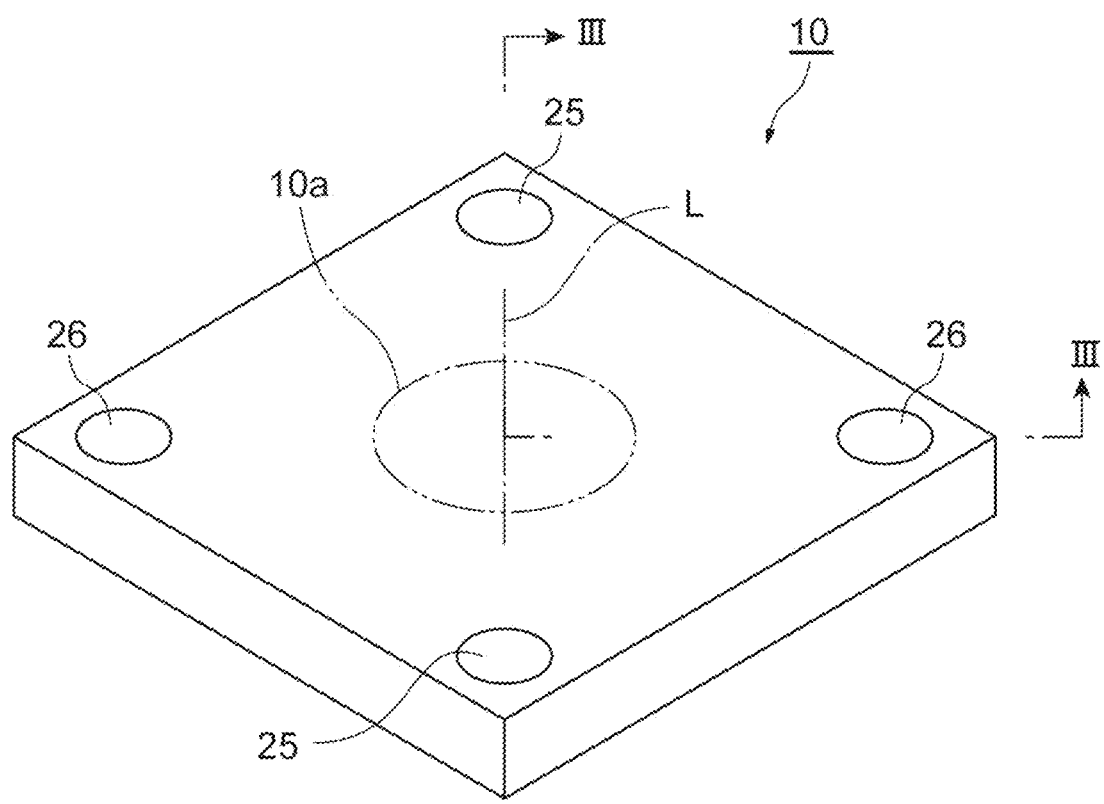
FIG. 2 is a perspective view of a Fabry-Perot interference filter.
Figure 3:
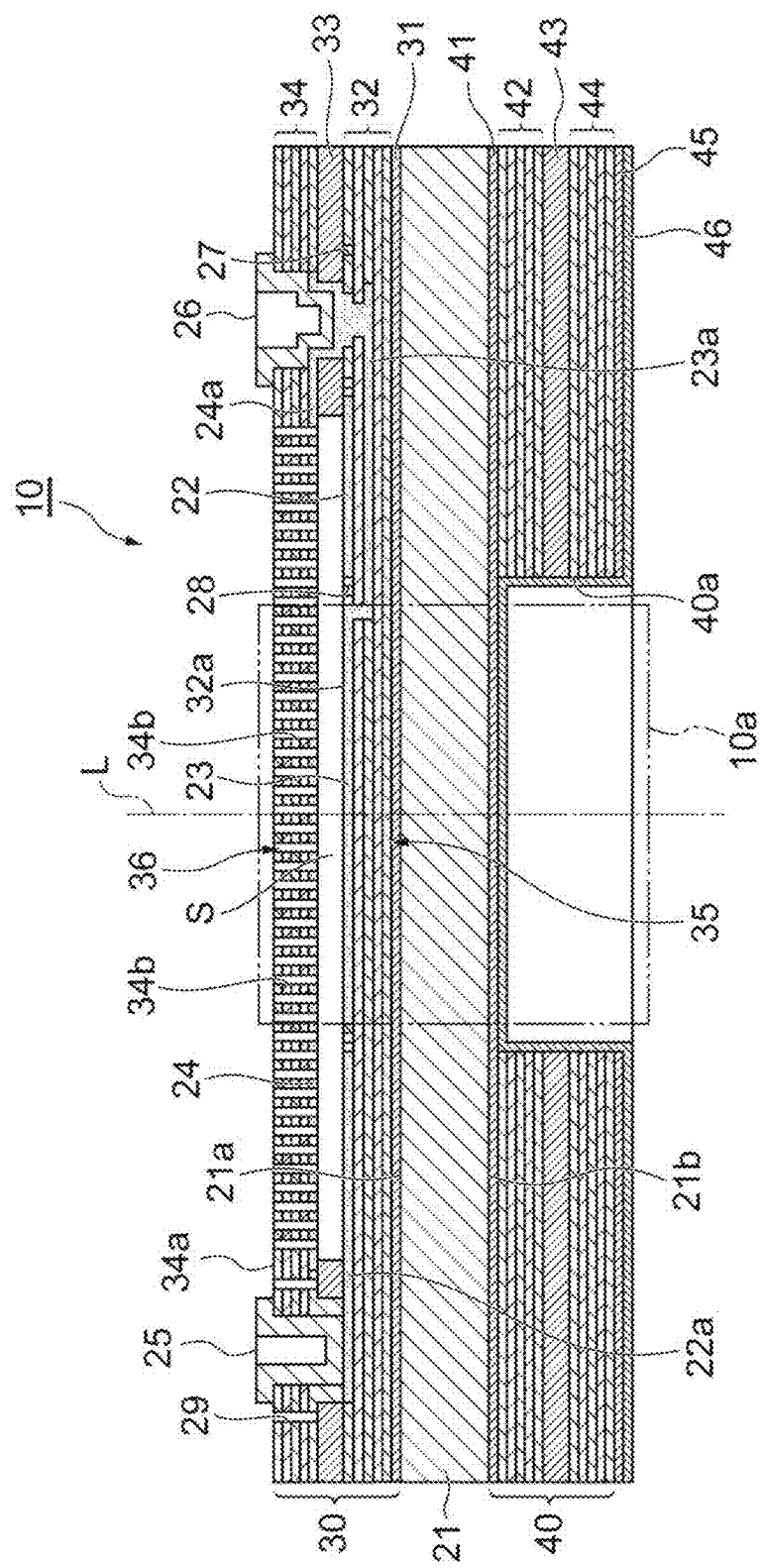
FIG. 3 is a cross-sectional view taken along line of FIG. 2.

As illustrated in FIGS. 2 and 3, in the Fabry-Perot interference filter 10, the light transmission region 10a for transmitting light according to the distance between a first mirror portion 35 and a second mirror portion 36 (that is, between the pair of mirror portions) is provided on the line L. The light transmission region 10a is, for example, a cylindrical region. In the light transmission region 10a, the distance between the first mirror portion 35 and the second mirror portion 36 is extremely accurately controlled. That is, the light transmission region 10a is a region where the distance between the first mirror portion 35 and the second mirror portion 36 can be controlled to a predetermined distance in order to selectively transmit light having a predetermined wavelength in the Fabry-Perot interference filter 10 and a region which can transmit the light having a predetermined wavelength according to the distance of the first mirror portion 35 and the second mirror portion 36.

The Fabry-Perot interference filter 10 includes a rectangular plate-shaped substrate 21. The substrate 21 has a first surface 21a and a second surface 21b facing each other in the direction parallel to the line L. The first surface 21a is a surface on the light incident side. The second surface 21b is a surface on the side (that is, the light emitting side) closer to the light detector 8. A first layer structure body 30 is disposed on the first surface 21a. A second layer structure body 40 is disposed on the second surface 21b.

The first layer structure body 30 is configured by stacking a first antireflection layer 31, a first stacked body 32, a first intermediate layer 33, and a second stacked body 34 in this order on the first surface 21a. A gap (air gap) S is formed between the first stacked body 32 and the second stacked body 34 by the frame-like first intermediate layer 33. The frame-like first intermediate layer 33 supports the thin film-like second stacked body 34 on the first stacked body 32 via the gap S. In the cross section along the line L, the width of the gap S in the light transmission region 10a is larger than the width of each gap S outside the light transmission region 10a. The substrate 21 is made of, for example, silicon, quartz, glass or the like. In a case where the substrate 21 is made of silicon, the first antireflection layer 31 and the first intermediate layer 33 are made of, for example, a silicon oxide. The thickness of the first intermediate layer 33 is, for example, several tens nm to several tens μm.

A portion of the first stacked body 32 corresponding to the light transmission region 10a functions as the first mirror portion 35. The first stacked body 32 is configured by alternately stacking a plurality of polysilicon layers and a plurality of silicon nitride layers one by one. The optical thickness of each of the polysilicon layer and the silicon nitride layer constituting the first mirror portion 35 is preferably an integral multiple of ¼ of the central transmission wavelength. In addition, the first mirror portion 35 may be disposed directly on the first surface 21a without the first antireflection layer 31.

A portion of the second stacked body 34 corresponding to the light transmission region 10a functions as the second mirror portion 36. The second mirror portion 36 faces the first mirror portion 35 via the gap S in the direction parallel to the line L. The second stacked body 34 is configured by alternately stacking a plurality of polysilicon layers and a plurality of silicon nitride layers one by one. The optical thickness of each of the polysilicon layer and the silicon nitride layer constituting the second mirror portion 36 is preferably an integral multiple of ¼ of the central transmission wavelength.

In the first stacked body 32 and the second stacked body 34, a silicon oxide layer may be disposed instead of the silicon nitride layer. In addition to the materials described above, a titanium oxide, a tantalum oxide, a zirconium oxide, a magnesium fluoride, an aluminum oxide, a calcium fluoride, silicon, germanium, a zinc sulfide, and the like may be used as the material of each layer constituting the first stacked body 32 and the second stacked body 34.

A plurality of through holes 34b extending from a surface 34a on the side of the second stacked body 34 opposite to the first intermediate layer 33 to the gap S are formed in a portion of the second stacked body 34 corresponding to the gap S. The plurality of through holes 34b are formed to such an extent that the plurality of through holes 34b do not substantially affect the function of the second mirror portion 36. The plurality of through holes 34b are used to form the gap S by removing a portion of the first intermediate layer 33 by etching.

In the first mirror portion 35, a first electrode 22 is formed so as to surround the light transmission region 10a. In the first mirror portion 35, a second electrode 23 is formed so as to include the light transmission region 10a. That is, the first mirror portion 35 includes the first electrode 22 and the second electrode 23. The first electrode 22 and the second electrode 23 are formed by doping the polysilicon layer closest to the gap S in the first stacked body 32 with impurities to reduce the resistance. A third electrode 24 is formed in the second mirror portion 36. That is, the second mirror portion 36 includes the third electrode 24. The third electrode 24 faces the first electrode 22 and the second electrode 23 via the gap S in the direction parallel to the line L. The third electrode 24 is formed by doping the polysilicon layer closest to the gap S in the second stacked body 34 with impurities to reduce the resistance. The size of the second electrode 23 is preferably a size including the entire light transmission region 10a, but may be substantially the same as the size of the light transmission region 10a.

The first layer structure body 30 is provided with a pair of first terminals 25 and a pair of second terminals 26. The pair of first terminals 25 face each other with the light transmission region 10a interposed therebetween. Each first terminal 25 is disposed in the through hole extending from the surface 34a of the second stacked body 34 to the first stacked body 32. Each first terminal 25 is electrically connected to the first electrode 22 through a wiring 22a. The pair of second terminals 26 face each other with the light transmission region 10a interposed therebetween in a direction perpendicular to the direction in which the pair of first terminals 25 face each other. Each second terminal 26 is disposed in the through hole extending from the surface 34a of the second stacked body 34 to the inside of the first intermediate layer 33. Each second terminal 26 is electrically connected to the second electrode 23 through a wiring 23a and electrically connected to the third electrode 24 through a wiring 24a.

Trenches 27 and 28 are provided on a surface 32a on the side of the first stacked body 32 closer to the first intermediate layer 33. The trench 27 extends in an annular shape so as to surround a connection portion of the wiring 23a with the second terminal 26. The trench 27 electrically insulates the first electrode 22 and the wiring 23a. The trench 28 extends in an annular shape along the inner edge of the first electrode 22. The trench 28 electrically insulates the first electrode 22 and the region (that is, the region where the second electrode 23 exists) inside the first electrode 22. A trench 29 is provided on the surface 34a of the second stacked body 34. The trench 29 extends in an annular shape so as to surround the first terminal 25. The trench 29 electrically insulates the first terminal 25 and the third electrode 24. The inner region of each of the trenches 27, 28, and 29 may be an insulating material or a gap.

The second layer structure body 40 is configured by stacking a second antireflection layer 41, a third stacked body 42, a second intermediate layer 43, and a fourth stacked body 44 in this order on the second surface 21b. The second antireflection layer 41, the third stacked body 42, the second intermediate layer 43, and the fourth stacked body 44 have the same configurations as the first antireflection layer 31, the first stacked body 32, the first intermediate layer 33, and the second stacked body 34, respectively. Thus, the second layer structure body 40 has a stacked structure symmetrical to the first layer structure body 30 with respect to the substrate 21. That is, the second layer structure body 40 is configured so as to correspond to the first layer structure body 30. The second layer structure body 40 has a function of suppressing warpage or the like of the substrate 21.

An opening 40a is formed in the third stacked body 42, the second intermediate layer 43, and the fourth stacked body 44 so as to include the light transmission region 10a. The center line of the opening 40a coincides with the line L. The opening 40a is, for example, a cylindrical region and has a diameter substantially the same as that of the light transmission region 10a. The opening 40a is opened on the light emitting side, and the bottom surface of the opening 40a reaches the second antireflection layer 41. The opening 40a passes light transmitted through the first mirror portion 35 and the second mirror portion 36.

A light shielding layer 45 is formed on the surface on the light emitting side of the fourth stacked body 44. The light shielding layer 45 is made of, for example, aluminum or the like. A protective layer 46 is formed on the surface of the light shielding layer 45 and the inner surface of the opening 40a. The protective layer 46 is made of, for example, an aluminum oxide. The optical influence of the protective layer 46 can be ignored by setting the thickness of the protective layer 46 to be in a range of 1 to 100 nm (preferably, about 30 nm).

The Fabry-Perot interference filter 10 configured as described above has a pair of the first mirror portion 35 and the second mirror portion 36 facing each other via the gap S. The distance between the pair of the first mirror portion 35 and the second mirror portion 36 is changed according to the potential difference generated between the pair of the first mirror portion 35 and the second mirror portion 36. That is, in the Fabry-Perot interference filter 10, a voltage is applied between the first electrode 22 and the third electrode 24 through the pair of first terminals 25 and the pair of second terminals 26. Accordingly, a potential difference is generated between the first electrode 22 and the third electrode 24 by the voltage, and thus, an electrostatic force corresponding to the potential difference is generated between the first electrode 22 and the third electrode 24. The second mirror portion 36 is attracted to the side of the first mirror portion 35 fixed to the substrate 21 by the electrostatic force, and thus, the distance between the first mirror portion 35 and the second mirror portion 36 is adjusted. Thus, in the Fabry-Perot interference filter 10, the distance between the first mirror portion 35 and the second mirror portion 36 is variable.

The wavelength of light transmitted through the Fabry-Perot interference filter 10 depends on the distance between the first mirror portion 35 and the second mirror portion 36 in the light transmission region 10a. Therefore, by adjusting the voltage applied between the first electrode 22 and the third electrode 24, the wavelength of light to be transmitted can be appropriately selected. As the potential difference between the first electrode 22 and the third electrode 24 increases, the distance between the first mirror portion 35 and the second mirror portion 36 is decreased, and thus, the wavelength of light transmitted through the Fabry-Perot interference filter 10 is reduced. The second electrode 23 has the same potential as the third electrode 24. Therefore, the second electrode 23 functions as a compensation electrode for maintaining the first mirror portion 35 and the second mirror portion 36 to be flat in the light transmission region 10a.

In the light detection device 1, for example, while changing the voltage applied to the Fabry-Perot interference filter 10 (that is, while changing the distance between the first mirror portion 35 and the second mirror portion 36 in the Fabry-Perot interference filter 10), it is possible to obtain a spectroscopic spectrum by detecting the intensity of light transmitted through the light transmission region 10a of the Fabry-Perot interference filter 10 by the light detector 8.

Figure 4:
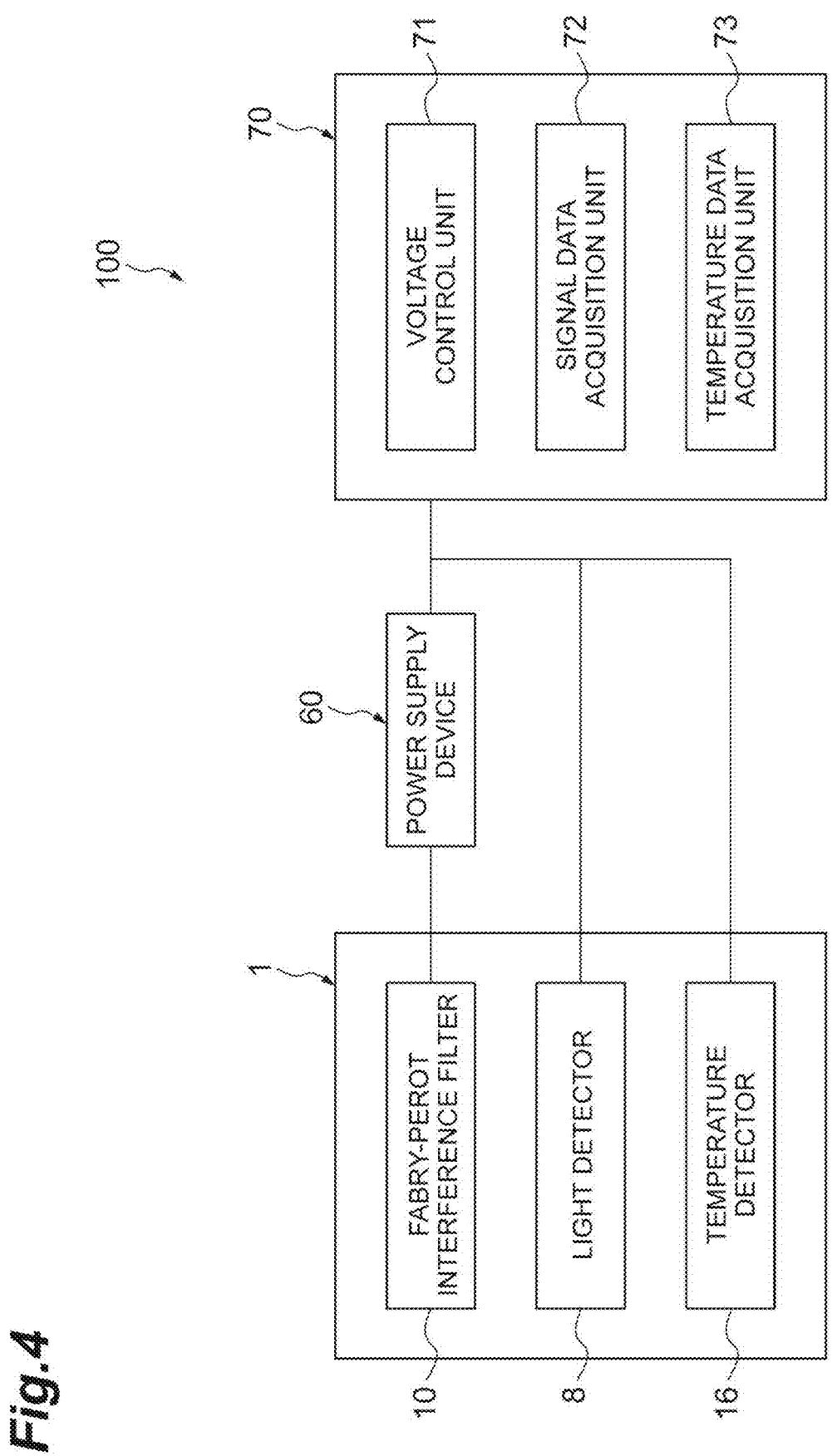
FIG. 4 is a block diagram illustrating a driving method of the light detection device.

Subsequently, the optical measurement system will be described with reference to FIG. 4. As illustrated in FIG. 4, an optical measurement system 100 includes the light detection device 1, a power supply device 60, and a control device 70. As described above, the light detection device 1 includes the Fabry-Perot interference filter 10, the light detector 8, and the temperature detector 16. The power supply device 60 can apply a voltage between the pair of the first mirror portion 35 and the second mirror portion 36 constituting the Fabry-Perot interference filter 10. More specifically, the power supply device 60 is electrically connected to the lead pin 11 and applies a voltage between the first electrode 22 and the third electrode 24 through the pair of first terminals 25 and the pair of second terminals 26.

The control device 70 includes a voltage control unit 71, a signal data acquisition unit (signal acquisition unit) 72, and a temperature data acquisition unit (temperature acquisition unit) 73. The control device 70 can be configured by a computer including an arithmetic circuit such as a CPU on which arithmetic processing is performed, a storage device configured by a memory such as a RAM and a ROM, and an input/output device. For example, the control device 70 may be configured by a computer such as a smart device including a smartphone, a tablet terminal, and the like. The control device 70 is electrically connected to the power supply device 60. In addition, the control device 70 is electrically connected to the light detector 8 and the temperature detector 16 of the light detection device 1. The optical measurement method executed in the control device 70 may be executed on the basis of a program stored in the storage device.

The voltage control unit 71 controls the voltage applied to the Fabry-Perot interference filter 10 on the basis of, for example, the condition set by the user. That is, the voltage control unit 71 outputs a control signal to the power supply device 60 and controls the voltage applied from the power supply device 60 to the Fabry-Perot interference filter 10. For example, the voltage control unit 71 outputs, to the power supply device 60, a control signal specifying the magnitude of the voltage to be applied, the timing of the application, and the duration time of the application. In addition, the voltage applied to the Fabry-Perot interference filter 10 is a voltage applied between the first electrode 22 and the third electrode 24.

The signal data acquisition unit 72 acquires the electric signal converted by the light detector 8. For example, the signal data acquisition unit 72 may retain the voltage applied to the Fabry-Perot interference filter 10 and the electric signal acquired in the state where the voltage is applied in association with each other on the basis of the control signal output from the voltage control unit 71 to the power supply device 60 and the acquired electric signal from the light detector 8.

The temperature data acquisition unit 73 acquires the temperature of the Fabry-Perot interference filter 10. In the present embodiment, the temperature data acquisition unit 73 acquires the temperature of the Fabry-Perot interference filter 10 on the basis of the input value from the temperature detector 16 in the light detection device 1. For example, in a case where the temperature detector 16 is a thermistor, the temperature data acquisition unit 73 acquires the electric resistance value of the thermistor and derives the temperature from the electric resistance value.

In the control device 70 of the present embodiment, the voltage control unit 71 generates a potential difference (a set potential difference) according to the wavelength of the light to be measured between the pair of mirror portions such that the wavelength of the light transmitted through the Fabry-Perot interference filter 10 becomes the wavelength of the light to be measured. For example, the voltage control unit 71 can apply a voltage (hereinafter referred to as a set voltage) set according to the wavelength of the light to be measured to the Fabry-Perot interference filter 10. Herein, an example of a method of deriving the set voltage in the voltage control unit 71 will be described.

First, the actually measured data of the voltage (control voltage) applied to the Fabry-Perot interference filter 10 and the peak transmission wavelength are measured, and the relationship between the control voltage and the peak transmission wavelength is fitted with a polynomial (seventh-order polynomial as an example) having the control voltage as a variable. Subsequently, coefficients of the polynomial are derived as wavelength conversion factors by fitting. Then, by using a polynomial specified by the wavelength conversion factors, a list in which the control voltage and the peak transmission wavelength correspond to each other on a one-to-one basis, for example, a list of peak transmission wavelengths with respect to the control voltage having a pitch of 0.25 mV is generated. In this list, the range of applied voltage may be limited. In this case, application of an excessive voltage to the Fabry-Perot interference filter 10 can be suppressed, and damage (sticking or the like) of the Fabry-Perot interference filter 10 can be suppressed.

Next, on the basis of the list of peak transmission wavelengths, for example, a list of control voltages with respect to the peak transmission wavelength having a pitch of 1 nm is generated. The wavelength range of the list of control voltages may be set in accordance with the corresponding wavelength range (for example, a wavelength range of 1550 to 1850 nm) of the Fabry-Perot interference filter 10. In the list of control voltages, the range of wavelengths may be limited. In this case, excessive application of voltage to the Fabry-Perot interference filter 10 can be suppressed, and damage (such as sticking) of the Fabry-Perot interference filter 10 can be suppressed. Incidentally, the list of control voltages may be generated by using a polynomial derived by fitting. In this case, the actually measured data of the voltage (control voltage) applied to the Fabry-Perot interference filter 10 and the peak transmission wavelength are measured, and the relationship between the control voltage and the peak transmission wavelength is fitted with a polynomial (seventh-order equation as an example) having the peak transmission wavelength as a variable. Subsequently, the coefficients of the polynomial are derived as voltage conversion factors by fitting, and the obtained polynomial is used to generate the list of control voltages. Accordingly, it is possible to derive the set voltage according to the wavelength of the light designated to be measured. In addition, by referring to the list of control voltages, the signal data acquisition unit 72 can associate the electric signal input from the light detector 8 with the peak transmission wavelength.

In addition, the peak transmission wavelength of the Fabry-Perot interference filter 10 is affected by temperature change. Therefore, in the present embodiment, a list may be generated by correcting the list of control voltages according to the temperature of the Fabry-Perot interference filter 10. For example, on the basis of the temperature of the Fabry-Perot interference filter 10 acquired by the temperature data acquisition unit 73 and the list of control voltages described above, a list of temperature-corrected control voltages for the peak transmission wavelength having a pitch of 1 nm is generated. In a case where the peak transmission wavelength varies at a substantially constant rate with temperature, the list of temperature-corrected control voltages can be generated by using the temperature correction coefficients.

In addition, in some cases, depending on the circuit configuration of the optical measurement system 100, there may occur a deviation between the voltage actually applied to the Fabry-Perot interference filter 10 and the voltage specified by the voltage control unit 71. Therefore, the voltage error may be corrected as needed. The list of control voltages for the peak transmission wavelengths having a pitch of 1 nm may be generated, for example, by reflecting voltage errors due to a circuit. Alternatively, for example, a mechanism for measuring the voltage actually applied to the Fabry-Perot interference filter 10 may be further provided. That is, in a case where there occurs a deviation between the measured voltage and the voltage specified by the voltage control unit 71, feedback control may be performed to adjust the control voltage so as to eliminate the deviation. In this case, it is possible to suppress an error between the voltage specified by the voltage control unit 71 and the voltage actually applied to the Fabry-Perot interference filter 10.

Figure 6:
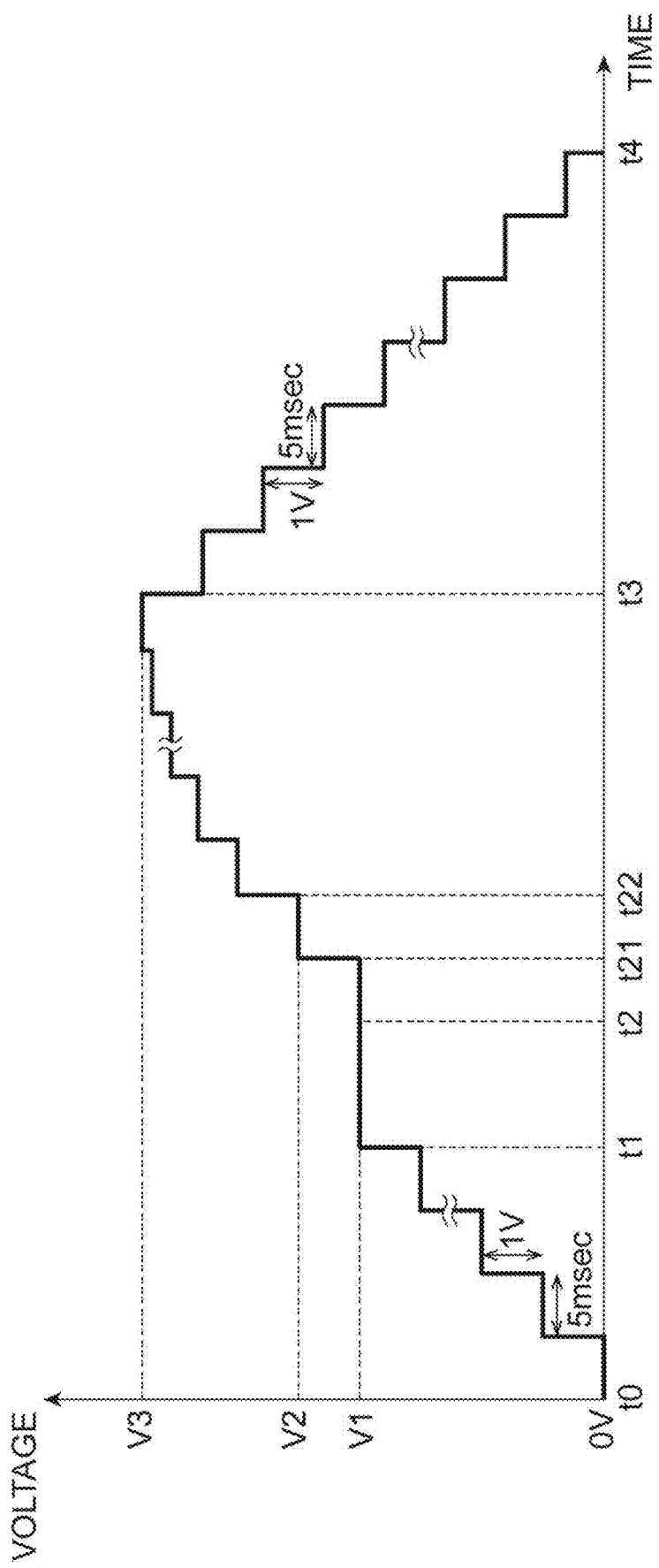
FIG. 6 is a graph showing a relationship between a voltage applied to the Fabry-Perot interference filter and a time.

Subsequently, control executed by the control device 70 will be described more in detail. FIG. 5 is a table representing a flow of the control by the control device 70. This table represents items of each control executed by the control device 70. In addition, the state of the voltage designated by the voltage control unit 71 is indicated for each item of control. In addition, FIG. 6 is a graph schematically showing the relationship between the voltage applied to the Fabry-Perot interference filter 10 and the time in a case where the control is performed according to the table of FIG. 5. In the present embodiment, the potential of the first electrode 22 is fixed at 0 V, and a voltage is applied to the second electrode 23 and the third electrode 24. That is, the magnitude of the voltage applied to the Fabry-Perot interference filter 10 corresponds to the potential difference generated between the first electrode 22 and the third electrode 24.

As illustrated in FIG. 5, at the time of the start of measurement by the optical measurement system 100, the voltage control unit 71 outputs a control signal including designation for not applying a voltage to the power supply device 60. That is, no voltage is applied to the Fabry-Perot interference filter 10 yet. At the time of the start, for example, the user may designate a range of wavelengths to be measured. Such designation can be performed by an input device or the like of the control device 70. In addition, the range of wavelengths to be measured may be determined in advance.

Subsequently, the control by the control device 70 proceeds to voltage setting for the measurement start (an example of the voltage control step). In the voltage setting for the measurement start, the voltage control unit 71 allows the voltage applied to the Fabry-Perot interference filter 10 to gradually rise (increase) until the voltage reaches the set voltage before the acquisition of the electric signal is started by the signal data acquisition unit 72. That is, the voltage control unit 71 outputs a control signal to the power supply device 60 so as to start the application of the voltage. Accordingly, the potential difference generated between the pair of mirror portions is allowed to gradually increase until the potential difference reaches the set potential difference corresponding to the set voltage. The voltage control unit 71 sets the set voltage corresponding to a wavelength initially detected in the range of wavelengths to be measured as a first wavelength voltage. Then, the voltage control unit 71 allows the voltage to gradually rise from the start of the application of the voltage until the voltage reaches the first wavelength voltage. In the present embodiment, the voltage control unit 71 controls the voltage in a form of a step function. For example, the value of the voltage designated by the voltage control unit 71 may be started from 0 V and may rise by 1 V increment every 5 msec. As shown in FIG. 6, the processing of the voltage setting for the measurement start is performed during the time period of t0 to t1. In this case, the value of the voltage V1 at the time t1 is the first wavelength voltage. In the present embodiment, the value of the voltage designated by the voltage control unit 71 is based on the list of control voltages described above, and the correction based on temperature or the like may be performed.

Incidentally, in the present specification, the phrase "allowing the voltage to gradually rise (fall) until the voltage reaches the set voltage" denotes that at least one step voltage between the present voltage and the set voltage until the voltage from the present voltage reaches the set voltage is set as the target voltage. In this case, the amount of change in the applied voltage with respect to time is greatly changed when the voltage from the present voltage reaches the target voltage. Then, once the amount of change is decreased, the amount of change is increased again toward the next target voltage. By repeating this process until the voltage reaches the set voltage, the voltage is allowed to gradually rise up to the set voltage.

Subsequently, the control by the control device 70 proceeds to a standby time period after the rise of voltage. In this control, the voltage control unit 71 maintains the state where the control signal for applying the first wavelength voltage is output to the power supply device 60 for only a predetermined standby time period (for example, 200 msec). This standby time period may be set freely, for example, by a user.

Subsequently, the control by the control device 70 proceeds to temperature measurement (an example of a temperature acquisition step). In control of the temperature measurement, the temperature data acquisition unit 73 acquires the temperature of the Fabry-Perot interference filter 10. This control includes voltage setting, an acquisition standby time period, and a processing time period. The voltage control unit 71 outputs a control signal for applying the first wavelength voltage to the power supply device 60 as the voltage setting. The temperature data acquisition unit 73 acquires an input value from the temperature detector 16 after a time (for example, 1 msec) designated as the acquisition standby time period has elapsed. Then, the temperature data acquired by the temperature data acquisition unit 73 is processed until the time (for example, 4 msec) designated as the processing time period elapses. That is, the temperature data can be recorded in the storage device of the control device 70 during this processing time period. In addition, for example, the list of control voltages may be corrected on the basis of the acquired temperature data. In this case, in the subsequent processing, the set voltage generated with reference to the list of corrected voltages is used. As shown in FIG. 6, the processing of the standby time period after the rise of voltage and the processing of temperature measurement are performed during the time period of t1 to t2. The voltage V1 is maintained during the time period of t1 to t2.

Subsequently, the control by the control device 70 proceeds to first wavelength measurement (an example of the signal acquisition step). In the control of the first wavelength measurement, the signal data acquisition unit 72 acquires an electric signal of the light detector 8 in a state where the first wavelength voltage is applied as the set voltage. That is, the signal data acquisition unit 72 acquires an electric signal in a state where a potential difference corresponding to the set voltage is generated between the pair of mirror portions. This control includes voltage setting, an acquisition standby time period, and a processing time period. The voltage control unit 71 outputs a control signal for applying the first wavelength voltage to the power supply device 60 as the voltage setting. By outputting the control signal for applying the first wavelength voltage again immediately before the first wavelength measurement, it is ensured that the intended voltage is applied at the time of measurement. In addition, the voltage based on the temperature-corrected list is reliably set. The signal data acquisition unit 72 acquires an electric signal from the light detector 8 after a time (for example, 1 msec) designated as the acquisition standby time period has elapsed. Then, the data of the electric signal acquired by the signal data acquisition unit 72 is processed until the time (for example, 4 msec) designated as the processing time period elapses. That is, data of the electric signal can be recorded in the storage device of the control device 70 during this processing time period. As shown in FIG. 6, the first wavelength measurement is performed during the time period of t2 to t21. In the present embodiment, the first wavelength voltage is continuously applied as the set voltage from the time t1 when the voltage setting for the measurement start is completed to the time t21 when the first wavelength measurement is completed.

Subsequently, the control by the control device 70 proceeds to second wavelength measurement. In the control of the second wavelength measurement, the signal data acquisition unit 72 acquires an electric signal of the light detector 8 in a state where a second wavelength voltage is applied as the set voltage. In this control, similarly to the first wavelength measurement, the second wavelength measurement includes voltage setting, an acquisition standby time period, and a processing time period. The voltage control unit 71 outputs a control signal for applying the second wavelength voltage to the power supply device 60 as the voltage setting. The signal data acquisition unit 72 acquires an electric signal from the light detector 8 after a time (for example, 1 msec) designated as the acquisition standby time period has elapsed. Then, the data of the electric signal acquired by the signal data acquisition unit 72 is processed until the time (for example, 4 msec) designated as the processing time period elapses Thereafter, the measurement is repeated in the order of the third wavelength measurement, the fourth wavelength measurement, until the measurement of the wavelength range to be measured is ended. In this case, the voltage control unit 71 sequentially applies each of the plurality of set voltages to the Fabry-Perot interference filter 10. As shown in FIG. 6, the processing of the second wavelength measurement is performed during the time period of t21 to t22. The processing of measurement after the third wavelength measurement is performed during the time period of t22 to t3. In addition, as shown in the graph, as the length of the wavelength to be measured is decreased, that is, as the set voltage to be applied is increased, the amount of change in voltage (difference between the set voltages) is decreased.

As shown in FIG. 6, in the present embodiment, the measurement is performed in the descending order of the wavelengths according to the set voltage. That is, the voltage V1 which is the first wavelength voltage is the smallest among the set voltages, the second wavelength voltage (voltage V2) is the next larger voltage, and then, in the order, the voltage V3 to be measured last is the maximum voltage.

In the present embodiment, the wavelength to be measured is set in 1 nm increments. In this case, as shown in the graph, as the wavelength to be measured is decreased, the magnitude of the increase in the set voltage is decreased.

Subsequently, the control by the control device 70 proceeds to voltage setting after the completion of measurement. After the completion of measurement, in the processing of the voltage setting, the voltage control unit 71 allows the voltage to be applied after the measurement of all the light of the wavelengths in the range to be measured to fall gradually from the setting voltage (voltage V3 in the example of FIG. 6) at the time of the completion of measurement. Accordingly, the potential difference generated between the pair of mirror portions is gradually decreased. For example, the value of the voltage designated by the voltage control unit 71 may be started from the set voltage (voltage V3) at the time of completion of measurement and may fall by 1 V increment every 5 msec. In the present embodiment, the voltage control unit 71 controls the voltage in a form of a step function. In addition, when the value of the voltage designated by the voltage control unit 71 becomes 0 V, the processing of voltage setting is ended after the completion of measurement. Accordingly, the measurement by the optical measurement system 100 is ended. In the optical measurement system 100, by the above-described processing, it is possible to acquire a spectroscopic spectrum of the light of the wavelength in the range to be measured.

Figure 7:
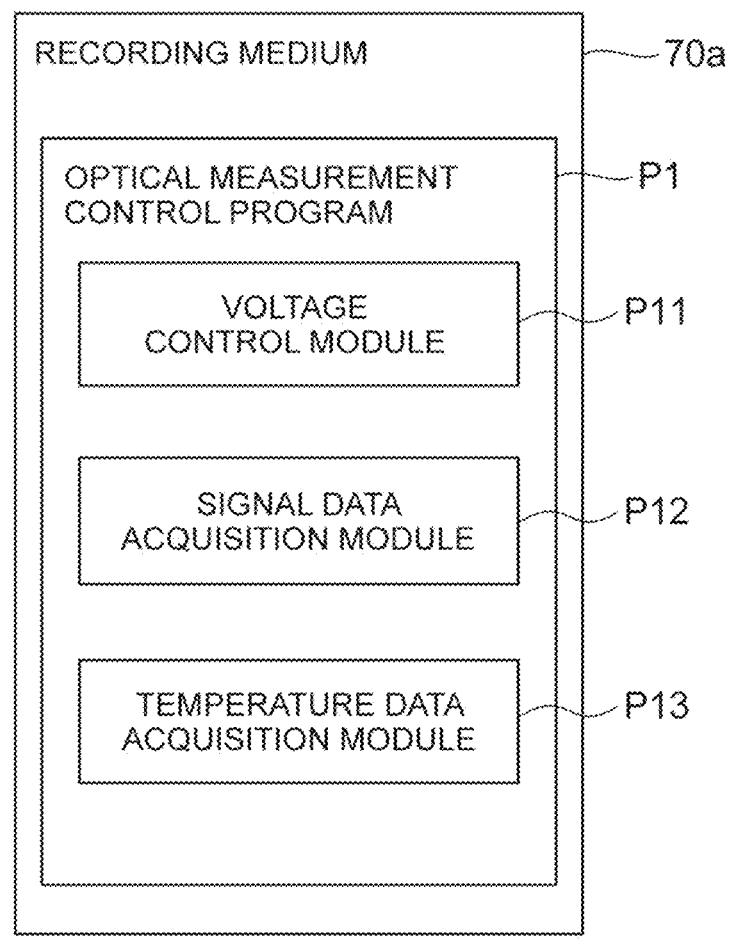
FIG. 7 is a diagram illustrating an optical measurement control program.

FIG. 7 is a diagram illustrating a recording medium 70a in which an optical measurement control program P1 for causing a computer to function as the control device 70 is stored. The optical measurement control program P1 stored in the recording medium 70a includes a voltage control module P11, a signal data acquisition module P12, and a temperature data acquisition module P13. The functions realized by executing the voltage control module P11, the signal data acquisition module P12, and the temperature data acquisition module P13 are the same as the functions of the voltage control unit 71, the signal data acquisition unit 72, and the temperature data acquisition unit 73, respectively.

The optical measurement control program P1 is recorded in a program recording area of the recording medium 70a. The recording medium 70a is configured as, for example, a recording medium such as a CD-ROM, a DVD, a ROM, or a semiconductor memory. The optical measurement control program P1 may be provided via a communication network as a computer data signal superimposed on a carrier wave.

In the optical measurement system 100 described above, the distance between the first mirror portion 35 and the second mirror portion 36 is controlled according to the magnitude of the voltage (that is, the potential difference between the first mirror portion 35 and the second mirror portion 36) applied to the Fabry-Perot interference filter 10. Accordingly, the wavelength of light transmitted through the Fabry-Perot interference filter 10 can be controlled. In this case, the light of the wavelength to be measured can be detected by applying a set voltage according to the wavelength of the light to be measured. Herein, after the voltage control unit 71 starts applying the voltage to the Fabry-Perot interference filter 10, the voltage control unit 71 allows the applied voltage to gradually rise until the applied voltage reaches the set voltage. That is, the potential difference between the pair of mirror portions is allowed to gradually increase. For this reason, the occurrence of overshoot is suppressed in comparison to a case where the voltage is applied rapidly. Accordingly, the sticking of the first mirror portion 35 and the second mirror portion 36 is suppressed. Therefore, the stable optical measurement using the Fabry-Perot interference filter 10 is enabled. In the Fabry-Perot interference filter 10 of the present embodiment, the thin film-like second stacked body 34 including the second mirror portion 36 is moved according to the applied voltage. In this case, the light-weight and low-rigidity second stacked body 34 can easily follow the applied voltage. Therefore, when the voltage overshoot occurs due to the rapid application of the voltage, the second stacked body 34 is immediately moved by following the voltage exceeding the target voltage. In this case, there is a possibility that sticking occurs due to the pull-in phenomenon. For this reason, the method according to the present embodiment is effective in which the applied voltage rises gradually while the overshoot is suppressed by limiting the width of the rise in voltage.

In addition, for example, in a case where the Fabry-Perot interference filter 10 and the light detector 8 are accommodated in a small package, the wiring of the Fabry-Perot interference filter 10 and the wiring of the light detector 8 may be close to each other. In this case, when a voltage is applied to the Fabry-Perot interference filter 10, crosstalk noise may be generated in the detection signal of the light detector 8 according to the change in voltage. For example, as in high-speed measurement, in the case of performing measurement immediately after applying a voltage, crosstalk noise may remain in the detection signal of the light detector 8, and thus, there is a concern that stable measurement may be difficult. In the present embodiment, the magnitude of the amount of change in the applied voltage is reduced by allowing the voltage to gradually rise until the voltage reaches the set voltage. By reducing the magnitude of the amount of change in the voltage, the generation of crosstalk noise is suppressed.

In addition, it is considered that, if the voltage is applied rapidly until the voltage reaches the set voltage, the movable portion of the Fabry-Perot interference filter 10 is rapidly deformed, so that the mirror portion is vibrated. In this case, it takes a long time to stabilize the vibration, and thus, there is a concern that stable measurement may be difficult. In the present embodiment, by applying the voltage gradually, the distance between the mirror portions is changed gradually, so that the vibration of the mirror portion is suppressed. Therefore, the stable measurement of light is enabled.

In addition, the signal data acquisition unit 72 can acquire an electric signal at the time when the standby time period has elapsed since the voltage applied to the Fabry-Perot interference filter 10 reaches the set voltage. According to this configuration, even if the temperature of the Fabry-Perot interference filter 10 rises due to the influence of the rise in voltage at the time of applying the set voltage, the temperature of the Fabry-Perot interference filter 10 is stabilized due to the standby time period, so that it is possible to suppress the variation of the transmission wavelength of the Fabry-Perot interference filter 10.

In addition, the temperature data acquisition unit 73 can acquire the temperature of the Fabry-Perot interference filter 10 after the voltage applied to the Fabry-Perot interference filter 10 reaches the set voltage and before the signal data acquisition unit 72 acquires an electric signal. According to this configuration, it is possible to acquire a temperature close to the temperature of the Fabry-Perot interference filter 10 at the time when the signal data acquisition unit 72 acquires an electric signal. Accordingly, for example, correction of the set voltage can be performed on the basis of the measured temperature.

In addition, after the signal data acquisition unit 72 acquires an electric signal corresponding to the wavelength of the light to be measured, the voltage control unit 71 may allow the voltage applied to the Fabry-Perot interference filter 10 to fall gradually from the set voltage. According to this configuration, since the distance between the first mirror portion 35 and the second mirror portion 36 is changed gradually after the completion of measurement, large vibration of the mirror portion is suppressed.

In addition, the voltage control unit 71 sequentially applies each of the plurality of set voltages to the Fabry-Perot interference filter 10, and thus, the signal data acquisition unit acquires electric signals corresponding to the plurality of set voltages. In this case, it is possible to obtain a spectroscopic spectrum by the optical measurement system.

In addition, the voltage control unit 71 can apply each of the plurality of set voltages to the Fabry-Perot interference filter 10 in the ascending order of the plurality of set voltages. In this case, the set voltage initially applied to the Fabry-Perot interference filter 10 becomes the minimum value among all the set voltages. For this reason, the absolute value of the initially applied voltage is suppressed to be small in comparison to a case where the first wavelength voltage is high, and thus, it is possible to suppress the generation of crosstalk noise. In addition, the amount of variation in voltage when the voltage reaches the maximum set voltage (that is, when the first mirror portion 35 and the second mirror portion 36 are closest to each other) can be reduced, and thus, it is possible to reduce the risk of occurrence of sticking.

Heretofore, although the embodiment of this disclosure is described in detail with reference to the drawings, a specific configuration is not limited to this embodiment.

For example, the flow of control executed by the control device 70 is not limited to the form illustrated in FIG. 5. Another example of the control executed by the control device 70 is illustrated in FIG. 8. In the description of the example of FIG. 8, the description of the portions common to FIG. 5 is appropriately omitted.

As illustrated in FIG. 8, in control by the control device 70 in another example, measurement of an arbitrary number of samples such as a first sample and a second sample is repeatedly performed. In the case of measuring each sample, the control of the voltage setting for the measurement start, the standby time period after the rise of voltage, the temperature measurement, the first wavelength measurement, and the like, and the voltage setting after the completion of measurement is the same as that of the above-described embodiment. In the example of FIG. 8, processing of the inter-sample standby time period is set between the measurement of one sample and the measurement of the next sample. In the illustrated example, a standby time period of 300 msec is set as an example. This standby time period is, for example, a time for the vibration of the Fabry-Perot interference filter 10 to converge. In this example, since the distance between the pair of mirror portions is changed gradually by the control of the voltage setting after the completion of measurement, the vibration of the mirror portions is suppressed. For this reason, the inter-sample standby time period can be set to be short, which is advantageous to the case of measuring a plurality of samples continuously at a high speed. Incidentally, in a case where high-speed measurement is emphasized, it is not necessary to provide an inter-sample standby time period.

In the above-described embodiment, the example in which the measurement is performed in the descending order of wavelengths according to the set voltage has been described. However, for example, the measurement may also be performed in the ascending order of wavelengths according to the set voltage. In this case, as shown in FIG. 9, the voltage is allowed to gradually rise until the voltage reaches the voltage V3 during the time period of t0 to t1 when the processing of the voltage setting for the measurement start is performed. The voltage V3 is a voltage corresponding to the shortest wavelength among the wavelengths to be measured. Then, during the time period of t1 to t2, the processing of the standby time period after the rise of voltage and the processing of the temperature measurement are performed. The processing of the first wavelength measurement is performed during the time period of t2 to t21. The processing of the second wavelength measurement is performed during the time period of t21 to t22. The processing of measurement after the third wavelength measurement is performed during the time period of t22 to t3. The processing of the voltage setting after the completion of measurement is performed during the time period of t3 to t4.

As in the example of FIG. 9, each of the plurality of setting voltages may be applied to the Fabry-Perot interference filter 10 by the voltage control unit 71 in the descending order of the plurality of setting voltages. In this case, as the measurement proceeds, the set voltage applied to the Fabry-Perot interference filter 10 is decreased. In general, in a Fabry-Perot interference filter in which the distance between a pair of mirrors is controlled by applying voltages to electrodes provided in the vicinity of the mirrors, the temperature rise according to the voltage rise tends to proceed more rapidly than the temperature drop according to the voltage drop. In a case where a portion of the first stacked body 32 including a mirror and a portion of a layer constituting the thin film-like second stacked body 34 including a mirror as in the above-described embodiment are used as electrodes, this tendency is likely to appear more prominently. Therefore, in comparison with the mode in which the measurement is performed at the time of the voltage rise in which the temperature easily rises, in the mode in which the measurement is performed at the time of the voltage drop in which the temperature does not easily fall, the change in temperature of the Fabry-Perot interference filter within the same measurement time can be suppressed. Accordingly, the variation in the wavelength of light transmitted through the Fabry-Perot interference filter 10 is suppressed.

In addition, in the embodiment, although the light detection device 1 in which the Fabry-Perot interference filter 10 and the light detector 8 are accommodated in one package is exemplified, the invention is not limited thereto. It is sufficient that the light transmitted through the Fabry-Perot interference filter can be detected by the light detector, and thus, the light does not necessarily have to be accommodated in one package. For example, the Fabry-Perot interference filter and the light detector may be separately disposed as separate components.

In the above-described embodiment, the example has been described in which the voltage rises or falls like a step function in the control of the voltage setting for the measurement start and the voltage setting after the completion of measurement. However, in the control, the mode in which the voltage rises or falls gradually may be employed, and the present invention is not particularly limited to the example in which the voltage rises or falls like a step function.

In addition, in the above-described embodiment, the example in which no voltage is applied to the Fabry-Perot interference filter 10 at the time of the start of measurement has been described, but the present invention is not limited thereto. For example, at the time of the start of measurement, a voltage may be applied such that the second mirror portion 36 of the Fabry-Perot interference filter 10 does not move significantly from the initial position (the position of the second mirror portion 36 when the applied voltage is 0 V). In this case, the amount of variation in voltage during the rise of the applied voltage to the first wavelength voltage is decreased, so that the risk of occurrence of sticking can be reduced.

Moreover, in the above-described embodiment, although the example which temperature is measured immediately before the first wavelength measurement is shown, the invention is not limited thereto. For example, in the measurement of the second and subsequent wavelengths by continuously measuring the temperature, the list of control voltages for the peak transmission wavelength may be corrected as needed.

In addition, during the processing time period (4 msec) at each wavelength illustrated in the above-described embodiment, the signals of the light detector are detected a plurality of times (for example, 128 times), and the detected signals may be averaged by the signal data acquisition unit. According to this configuration, it is possible to reduce the influence of noise contained in the electric signal from the light detector. In a case where the noise contained in the electric signal from the light detector is large, the number of times of detection of the signal may be further increased and averaged. In this case, the processing time period at each wavelength may be increased as needed.

REFERENCE SIGNS LIST

1: light detection device, 8: light detector (light detection unit), 70: control device (control unit), 71: voltage control unit, 72: signal data acquisition unit (signal acquisition unit), 73: temperature data acquisition unit (temperature acquisition unit), 100: optical measurement system.

The invention claimed is:

1. A non-transitory computer-readable recording medium recording an optical measurement control program in a light detection device including: a Fabry-Perot interference filter having a pair of mirrors facing each other via a gap, a distance between the pair of mirrors changing according to a potential difference generated between the pair of mirrors; and a light detector detecting light transmitted through the Fabry-Perot interference filter, the optical measurement control program causing a computer to execute a process of measuring light to be measured by acquiring an electric signal for a measurement output from the light detector, the optical measurement control program causing the computer to function as:
 a voltage control unit configured to control the potential difference generated between the pair of mirrors to gradually increase until the potential difference reaches a set potential difference corresponding to a wavelength of the light to be measured before an acquisition of the electric signal is started; and
 a signal acquisition unit configured to acquire the electric signal in a state where the voltage control unit allows the set potential difference to be generated between the pair of mirrors,
 wherein the voltage control unit is configured to set, as a target potential difference, a potential difference corresponding to a wavelength at which the signal acquisition unit does not acquire the electric signal output from the light detector in at least one step.

2. The non-transitory computer-readable recording medium according to claim 1, wherein the signal acquisition unit acquires the electric signal after a standby time period has elapsed since the potential difference generated between the pair of mirrors reaches the set potential difference.

3. The non-transitory computer-readable recording medium according to claim 1, causing the computer to further function as a temperature acquisition unit acquiring a temperature of the Fabry-Perot interference filter,
 wherein the temperature acquisition unit acquires the temperature of the Fabry-Perot interference filter after the potential difference generated between the pair of mirrors reaches the set potential difference and before the signal acquisition unit acquires the electric signal.

4. The non-transitory computer-readable recording medium according to claim 1, wherein after the electric signal is acquired by the signal acquisition unit, the voltage control unit allows the potential difference generated between the pair of mirrors to gradually decrease from the set potential difference.

5. The non-transitory computer-readable recording medium according to claim 1,
 wherein the set potential difference includes a plurality of set potential differences corresponding to a plurality of different wavelengths, and
 wherein the voltage control unit
 allows each of the plurality of set potential differences to be sequentially generated between the pair of mirrors, and
 allows the potential difference generated between the pair of mirrors to gradually increase until the potential difference reaches an initial set potential difference among the plurality of set potential differences before the acquisition of the electric signal is started by the signal acquisition unit.

6. The non-transitory computer-readable recording medium according to claim 5, wherein the voltage control unit allows each of the plurality of set potential differences to be generated between the pair of mirrors in ascending order of the plurality of set potential differences.

7. The non-transitory computer-readable recording medium according to claim 5, wherein the voltage control unit allows each of the plurality of set potential differences to be generated between the pair of mirrors in descending order of the plurality of set potential differences.

8. An optical measurement system comprising:
 a Fabry-Perot interference filter having a pair of mirrors facing each other via a gap, a distance between the pair of mirrors changing according to a potential difference generated between the pair of mirrors;
 a light detector configured to detect light transmitted through the Fabry-Perot interference filter; and
 a control device configured to control the potential difference generated between the pair of mirrors and to acquire an electric signal for a measurement output from the light detector,
 wherein the control device includes:
 a voltage control circuit configured to allow a set potential difference to be generated between the pair of mirrors according to a wavelength of light to be measured such that a wavelength of light transmitted through the Fabry-Perot interference filter becomes the wavelength of the light to be measured; and
 a signal acquisition circuit configured to acquire the electric signal in a state where the voltage control circuit allows the set potential difference to be generated between the pair of mirrors,
 wherein the voltage control circuit allows the potential difference generated between the pair of mirrors to gradually increase until the potential difference reaches the set potential difference before an acquisition of the electric signal is started by the signal acquisition circuit, and wherein the voltage control circuit sets, as a target potential difference, a potential difference corresponding to a wavelength at which the signal acquisition circuit does not acquire the electric signal output from the light detector in at least one step.

9. The optical measurement system according to claim 8, wherein the signal acquisition circuit acquires the electric signal after a standby time period has elapsed since the potential difference generated between the pair of mirrors reaches the set potential difference.

10. The optical measurement system according to claim 8, wherein the control device further includes a temperature acquisition circuit configured to acquire a temperature of the Fabry-Perot interference filter, and wherein the temperature acquisition circuit acquires the temperature of the Fabry-Perot interference filter after the potential difference generated between the pair of mirrors reaches the set potential difference and before the signal acquisition circuit acquires the electric signal.

11. The optical measurement system according to claim 8, wherein after the electric signal is acquired by the signal acquisition circuit, the voltage control circuit allows the potential difference generated between the pair of mirrors to gradually decrease from the set potential difference.

12. The optical measurement system according to claim 8, wherein the set potential difference includes a plurality of set potential differences corresponding to a plurality of different wavelengths, and wherein the voltage control circuit allows each of the plurality of set potential differences to be sequentially generated between the pair of mirrors, and allows the potential difference generated between the pair of mirrors to gradually increase until the potential difference reaches an initial set potential difference among the plurality of set potential differences before the acquisition of the electric signal is started by the signal acquisition circuit.

13. The optical measurement system according to claim 12, wherein the voltage control circuit allows each of the plurality of set potential differences to be generated between the pair of mirrors in ascending order of the plurality of set potential differences.

14. The optical measurement system according to claim 12, wherein the voltage control circuit allows each of the plurality of set potential differences to be generated between the pair of micros in descending order of the plurality of set potential differences.

15. An optical measurement method of measuring light to be measured by acquiring an electric signal for a measurement output from a light detector by using a light detection device including:

a Fabry-Perot interference filter having a pair of mirrors facing each other via a gap, a distance between the pair of mirrors changing according to a potential difference generated between the pair of mirrors; and the light detector configured to detect light transmitted through the Fabry-Perot interference filter, the optical measurement method comprising:

gradually increasing the potential difference generated between the pair of mirrors until the potential difference reaches a set potential difference corresponding to a wavelength of the light to be measured before an acquisition of the electric signal is started; and acquiring the electric signal in a state where the set potential difference is generated between the pair of mirrors after the gradually increasing the potential difference, wherein a target potential difference is set as a potential difference corresponding to a wavelength at which the electric signal output from the light detector is not acquired in at least one step.

16. The optical measurement method according to claim 15, wherein, in the acquiring the electric signal, the electric signal is acquired when a standby time period has elapsed after the potential difference generated between the pair of mirrors reaches the set potential difference.

17. The optical measurement method according to claim 15, further comprising acquiring a temperature of the Fabry-Perot interference filter, wherein, in the acquiring the temperature, the temperature of the Fabry-Perot interference filter is acquired after the potential difference generated between the pair of mirrors reaches the set potential difference and before the electric signal is acquired.

18. The optical measurement method according to claim 15, wherein, in the gradually increasing the potential difference, after the electric signal is acquired, the potential difference generated between the pair of mirrors is allowed to gradually decrease from the set potential difference.

19. The optical measurement method according to claim 15, wherein the set potential difference includes a plurality of set potential differences corresponding to a plurality of different wavelengths, and wherein, in the gradually increasing the potential difference, each of the plurality of set potential differences is allowed to be sequentially generated between the pair of mirrors, and the potential difference generated between the pair of mirrors is allowed to gradually increase until the potential difference reaches an initial set potential difference among the plurality of set potential differences before the acquisition of the electric signal is started.

20. The optical measurement method according to claim 19, wherein, in the gradually increasing the potential difference, each of the plurality of set potential differences is allowed to be generated between the pair of mirrors in ascending order of the plurality of set potential differences.

21. The optical measurement method according to claim 19, wherein, in the gradually increasing the potential difference, each of the plurality of set potential differences is allowed to be generated between the pair of mirrors in descending order of the plurality of set potential differences.

22. An optical measurement system comprising:

a Fabry-Perot interference filter having a pair of mirrors facing each other via a gap, a distance between the pair of mirrors changing according to a potential difference generated between the pair of mirrors;

a light detector configured to detect light transmitted through the Fabry-Perot interference filter; and a control device configured to control the potential difference generated between the pair of mirrors and to acquire an electric signal for a measurement output from the light detector, wherein the control device includes:

a voltage control circuit configured to allow a set potential difference to be generated between the pair of mirrors according to a wavelength of light to be measured such that a wavelength of light transmitted through the Fabry-Perot interference filter becomes the wavelength of the light to be measured; and a signal acquisition circuit configured to acquire the electric signal in a state where the voltage control circuit allows the set potential difference to be generated between the pair of mirrors, wherein the voltage control circuit allows the potential difference generated between the pair of mirrors to gradually change until the potential difference reaches the set potential difference, and wherein the voltage control circuit sets, as a target potential difference, a potential difference corresponding to a wavelength at which the signal acquisition circuit does not acquire the electric signal output from the light detector in at least one step.

23. A non-transitory computer-readable recording medium recording an optical measurement control program in a light detection device including: a Fabry-Perot interference filter having a pair of mirrors facing each other via a gap, a distance between the pair of mirrors changing according to a potential difference generated between the pair of mirrors; and a light detector detecting light transmitted through the Fabry-Perot interference filter, the optical measurement control program causing a computer to execute a process of measuring light to be measured by acquiring an electric signal for a measurement output from the light detector, the optical measurement control program causing the computer to function as:

a voltage control unit configured to control the potential difference generated between the pair of mirrors to gradually increase until the potential difference reaches a set potential difference corresponding to a wavelength of the light to be measured; and a signal acquisition unit configured to acquire the electric signal in a state where the voltage control unit allows the set potential difference to be generated between the pair of mirrors, wherein the voltage control unit is configured to set, as a target potential difference, a potential difference corresponding to a wavelength at which the signal acquisition unit does not acquire the electric signal output from the light detector in at least one step.

24. An optical measurement method of measuring light to be measured by acquiring an electric signal for a measurement output from a light detector by using a light detection device including:

a Fabry-Perot interference filter having a pair of mirrors facing each other via a gap, a distance between the pair of mirrors changing according to a potential difference generated between the pair of mirrors; and the light detector configured to detect light transmitted through the Fabry-Perot interference filter, the optical measurement method comprising:

gradually increasing the potential difference generated between the pair of mirrors until the potential difference reaches a set potential difference corresponding to a wavelength of the light to be measured; and acquiring the electric signal in a state where the set potential difference is generated between the pair of mirrors after the gradually increasing the potential difference, wherein a target potential difference is set as a potential difference corresponding to a wavelength at which the electric signal output from the light detector is not acquired in at least one step.

* * * * *